US006409596B1

(12) United States Patent
Hayashida et al.

(10) Patent No.: US 6,409,596 B1
(45) Date of Patent: Jun. 25, 2002

(54) GAME DEVICE AND IMAGE DISPLAYING METHOD WHICH DISPLAYS A GAME PROCEEDING IN VIRTUAL SPACE, AND COMPUTER-READABLE RECORDING MEDIUM

(75) Inventors: Yasuhiro Hayashida; Atsushi Ueno; Taishi Yasuda, all of Tokyo (JP)

(73) Assignee: Kabushiki Kaisha Sega Enterprises, Tokyo (JP)

( * ) Notice: Subject to any disclaimer, the term of this patent is extended or adjusted under 35 U.S.C. 154(b) by 0 days.

(21) Appl. No.: 09/150,595

(22) Filed: Sep. 10, 1998

(30) Foreign Application Priority Data

Sep. 12, 1997 (JP) .............................................. 9-248081

(51) Int. Cl.7 ............................................... A63F 13/00
(52) U.S. Cl. ............................................ 463/31; 463/33
(58) Field of Search ................................ 463/31–34, 6, 463/58–63; 434/61, 62–64, 67, 68, 69, 65, 66

(56) References Cited

U.S. PATENT DOCUMENTS

| | | | | |
|---|---|---|---|---|
| 4,672,541 A | * | 6/1987 | Bromley et al. ............ | 364/410 |
| 5,184,956 A | * | 2/1993 | Langlais et al. ............... | 464/69 |
| 5,269,687 A | * | 12/1993 | Mott et al. ..................... | 434/65 |
| 5,299,810 A | * | 4/1994 | Pierce et al. ................. | 273/434 |
| 5,354,202 A | * | 10/1994 | Moncrief et al. .............. | 434/65 |
| 5,415,550 A | * | 5/1995 | Aoki et al. .................... | 434/61 |
| 5,607,308 A | * | 3/1997 | Copperman et al. .......... | 434/62 |
| 5,816,913 A | * | 10/1998 | Nakamura ...................... | 463/6 |
| 5,910,046 A | * | 6/1999 | Wada et al. ................... | 434/65 |
| 6,142,871 A | * | 11/2000 | Inoue ............................. | 463/6 |

* cited by examiner

Primary Examiner—Valencia Martin-Wallace
Assistant Examiner—Julie Brochetti
(74) Attorney, Agent, or Firm—Keating & Bennett, LLP

(57) ABSTRACT

A small screen which enables a player to easily grasp the situation of a game field as well as the positional relationship between the game objects is displayed on a game screen in a game device. A game device which displays on a monitor screen a picture of a game being proceeded in a virtual space by a first object controlled by a player and a second object controlled by a computer comprises a supplementary screen forming means (S210) for forming on the monitor screen a small screen showing the surrounding condition with the first object in the center, a distance calculating means (S202) for calculating the distance between the first object and the second object in the virtual space, and a display magnification setting means (S208) for setting the display magnification on the small screen in correspondence with the distance between the above objects.

15 Claims, 13 Drawing Sheets

(A)

(B)

GAME DEVICE AND IMAGE DISPLAYING METHOD WHICH DISPLAYS A GAME PROCEEDING IN VIRTUAL SPACE, AND COMPUTER-READABLE RECORDING MEDIUM

BACKGROUND OF THE INVENTION

1. Field of the Invention

The present invention generally relates to a game device. More particularly, it relates to a game device loaded with a program for game play wherein an object simulating the likes of a car, for example, is placed on a virtual space and a picture of such object moving in response to the operation from the player is displayed on the TV screen.

2. Description of the Related Art

Pursuant to the advancement of computer technology, there is a demand for game devices with clearer and more realistic images regardless of such game device being for home use or business use. Generally, a game device comprises a game device body with a built-in computer device for performing previously stored game programs, an operation apparatus for providing to the computer device operation signals which give such orders as to move the displayed object, a display for displaying images accompanying the game progress upon the game program being performed with the computer device, and a sound device for generating sounds accompanying such game progress.

As one field of a game device with this type of structure, there is a game device which deals with driving games (automobile racing games).

Moreover, there is a game device which advances a competition-type battle game by freely moving an object within the virtual space pursuant to operation signals from the player.

In order to show the position of the enemy or the object operated by the player in a virtual space as well as to enable the player to easily grasp the surrounding situation thereof, this type of game displays, on a game screen, a supplementary information screen such as a simplified map or a so-called radar screen which shows the arrangement of enemies, comrades, etc.

However, if a supplementary information screen showing the surroundings of the object ("player's machine") operated by the player to a great distance is displayed by being overlaid on a screen, the wide field of a virtual space will be reduced and displayed. Thereby, since information of the player's machine and the surrounding information thereof will be relatively displayed small, it is difficult to obtain detailed information.

In consideration of the above points, if only the vicinity of the object is displayed in order to provide detailed surrounding supplementary information, there was a problem in that movement of the player's machine at fast speeds and the prediction of the game progress became difficult since it would be difficult to grasp the situation of the next progress (e.g., a situation such as an object controlled by another player or a computer program ("opponent's machine") comes charging toward the player's machine).

On the contrary, in such a game which progresses while a player aims for the goal by advancing on the racecourse and performs an offensive and defensive battle with the opponent's machine, the relative position of the player's machine and the opponent's machine should be made such that it may be effectively grasped. Furthermore, the progress of the game thereafter should be made, for example, so that the player may even easily grasp the racecourse when necessary.

Thereby, an object of the present invention is to provide a game device which displays a supplementary screen for informing the detailed shape of the racecourse ahead on a game screen.

Another object of the present invention is to provide a game device comprising a supplementary screen which displays the relative position of the player's machine and the opponent's machine such that it may be easily grasped by the player.

Still another object of the present invention is to provide a game device which displays information relating to the opponent's machine behind the player's machine.

SUMMARY OF THE INVENTION

In order to achieve the above objects, a game device of the present invention which displays on a monitor screen a picture of a game being proceeded in a virtual space by a first object controlled by a player and a second object controlled by a computer or an opponent, comprises:

support screen forming means (S210) for forming in the monitor screen a small screen displaying (or illustrating) information which supports the control of the first object;

display mode alteration distinguishing means (S206) for distinguishing whether or not a condition falls under a prescribed condition to alter the display scale for reduction and magnification (hereinafter referred to as the "display magnification") of the small screen during the game progress in the virtual space; and display magnification setting means (S208) for setting the display magnification of the small screen pursuant to the distinction result of the distinguishing means.

The aforementioned prescribed condition is, for example, the distance between the first object and the second object exceeding a reference value.

The aforementioned prescribed condition is, for example, the moving speed of the first object exceeding a reference value.

The aforementioned prescribed condition is, for example, whether or not the first object moves to a predetermined position in the virtual space.

The aforementioned prescribed condition is, for example, whether or not a predetermined event occurred in the virtual space.

A game device which displays on a monitor screen a picture of a game being proceeded in a virtual space by a first object controlled by a player and a second object controlled by a computer or an opponent, comprises:

support screen forming means (S210) for forming in the monitor screen a small screen indicating surrounding conditions with the first object in the center;

distance calculating means (S202) for calculating the distance between the first object and the second object in the virtual space;

display magnification setting means (S208) for setting a display magnification in correspondence with the distance from a plurality of predetermined display magnifications regarding the small screen; and hysteretic movement means (S208, FIG. 10) for performing hysteretic movement to the setting of the display magnification by differing the correspondence of the distance and the display magnification upon increasing or decreasing the display magnification from the present value.

Preferably, the display magnification setting means, upon setting said display magnification, gradually moves the display magnification from the present value to the display magnification to be set (FIG. 11).

For example, the small screen includes a course map and the display magnification setting means sets the reduced scale of the course map according to the distance.

For example, a plurality of second objects exist and the distance calculating means calculates each distance between the first object and plurality of second objects and outputs the shortest distance thereof (FIGS. 7 through 9).

According to the above structure, when the opponent's machine (or opponent's bike) which is the second object does not exist nearby, it will be easy for the player to grasp the relative position relationship between the player's machine (or player's bike) which is the first object and the opponent's bike since the display reduction (or display magnification) of the small screen is largely set. Furthermore, if an opponent's bike is not nearby, the display reduction of the small screen will be set small thereby enabling the player to see the shape of the racecourse in a wide field. This is a preferable game supporting screen for games that proceed races while engaging in battles. Moreover, frequent switching of the screen may be avoided.

A game device which displays on a monitor screen a picture of a game being proceeded in a virtual space by a first object controlled by a player and a second object controlled by a computer or an opponent, comprises:

distance calculating means (S306) for calculating the distance between the first object or a virtual camera and the second object positioned behind the first object within the virtual space; and symbol forming means (S306) of rear objects for forming the second object into a symbol in a size in correspondence with the distance so as to be displayed on the monitor screen.

According to the above structure, the player's attention may be drawn to the opponent's machine (or opponent's bike) which is a second object approaching from the rear but not displayed on the screen during the game.

A game device which monitors with a virtual camera a picture of a game being proceeded in a virtual space by a first object controlled by a player and a second object controlled by a computer or an opponent and displays such picture on the screen of a monitor, comprises:

camera position switch ordering means (22) for issuing switching orders to switch the position of the virtual camera to a first position which shows the front of the first object from the position of such object or the vicinity thereof and to a second position which shows the front of the first object from the rear of the first object; and symbol displaying means (S406) for displaying a symbol representing the second object on the monitor screen in correspondence with the switching order to switch the position of the virtual camera to the first position (S402) upon the second object existing behind the first object (S404).

A game device which monitors with a virtual camera a picture of a game being proceeded in a virtual space by a first object controlled by a player and a second object controlled by a computer or an opponent and displays such picture on the screen of a monitor, comprises;

camera position switch ordering means (22) for issuing switching orders to switch the position of the virtual camera to a first position which displays the front of the first object but not the back thereof and to a second position which shows the front of the first object from the rear of the first object; and symbol displaying means (S406) for displaying on said monitor screen a symbol representing the second object in correspondence with the switching order to switch the position of the virtual camera to the first position (S402) upon the second object existing behind the first object (S404).

Preferably, the symbol displaying means includes:

distance calculating means (S406) for calculating the distance between the first object or the virtual camera and the second object existing behind the first object in the virtual space; and symbol forming means (S406) for setting forth the size of the symbol to be displayed on the monitor screen in correspondence with the distance.

Preferably, the symbol creating means further sets forth the display position of the symbol on the screen of the monitor in correspondence with the position of the second object in the virtual space According to the above structure, information regarding objects in the rear which disappear from the game screen upon switching the camera viewpoint may be adequately displayed in the game screen.

In the game device which displays on a monitor screen a picture of a game being proceeded in a virtual space by a first object controlled by a player and a second object controlled by a computer or an opponent, an image displaying method of a game device according to the present invention comprises:

a small screen forming step (S210) for forming in the monitor screen a small screen displaying the surrounding situation of the first object;

a distinguishing step (S206) for distinguishing whether or not a condition falls under a prescribed condition to magnify or reduce the display of the small screen during the game progress in the virtual space; and a display altering step (S208) for altering the display of the small screen to be magnified or reduced upon falling under the condition.

According to the above structure, the content to be displayed on the small screen is, whether magnified or reduced, displayed in an adequate display magnification (or scale) in accordance with the prescribed conditions during the game progress. Thereby, the small screen having a small display area may be used as an overall display or a partial display to effectively show the necessary information.

Preferably, aforementioned prescribed condition is at least one among:

(a) the distance between the first object and the second object exceeding a reference value;

(b) the moving speed of the first object exceeding a reference value;

(c) the first object moving to a predetermined position in the virtual space; or (d) whether or not a predetermined event occurred in the virtual space.

Preferably, the display altering step further gradually magnifies or reduces the outer frame of the field including the first object displayed on the small screen without changing the overall size of the small screen by gradually changing the display magnification of the small screen.

Preferably, the small screen forming step further displays the first object and second object as symbols on a course map of a game, and the display altering step further sets the reduced scale of the course map according to the distance between the first object and second object.

The information recording medium according to the present invention stores a program to make a computer function as the game device mentioned above.

Furthermore, the information recording medium according to the present invention stores a program to make a computer perform the aforementioned image displaying method.

DESCRIPTION OF THE PREFERRED EMBODIMENTS

Figure 1:
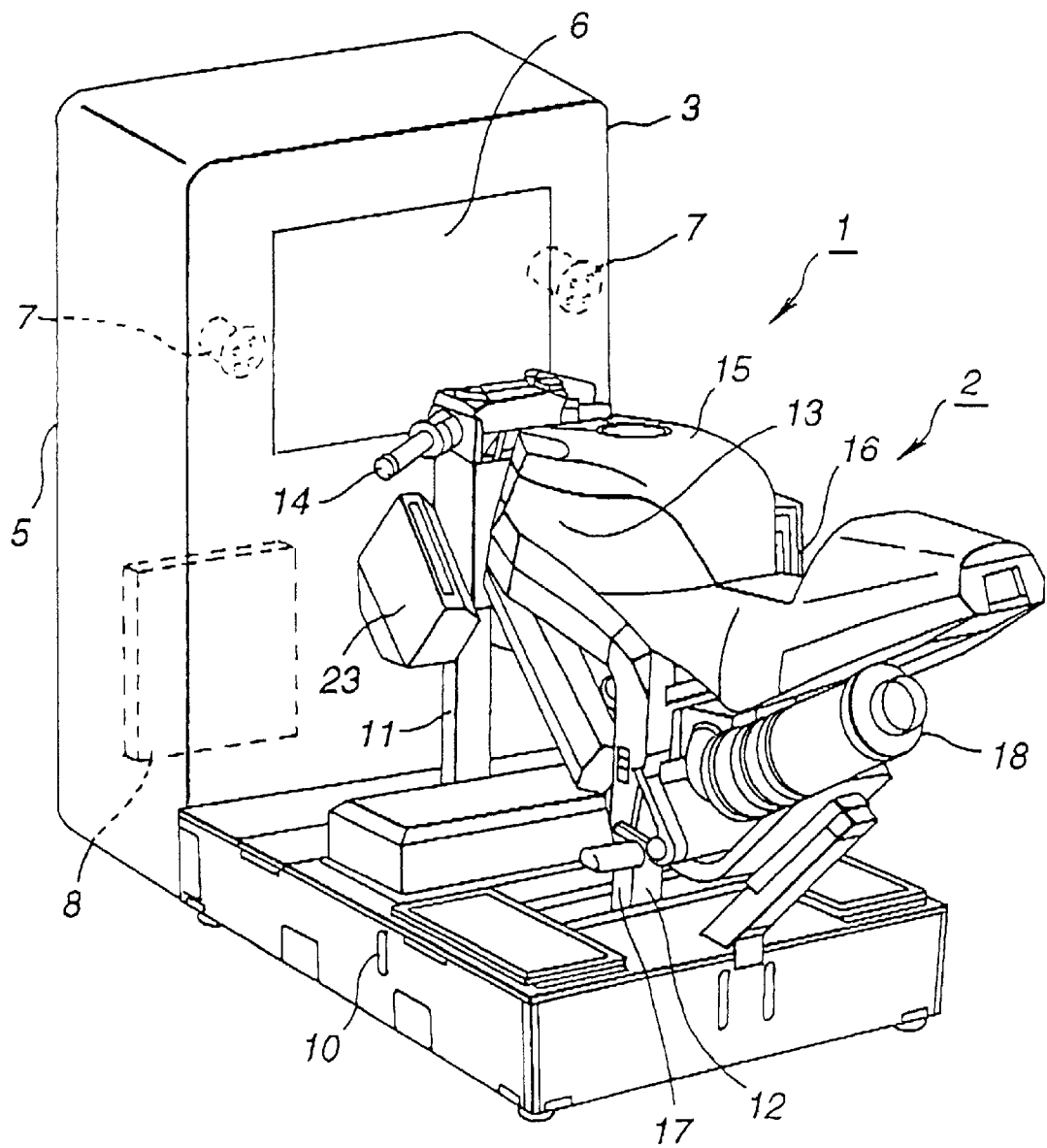
FIG. 1 is a perspective view showing the outline of the game device according to an embodiment of the present invention.
Figure 2:
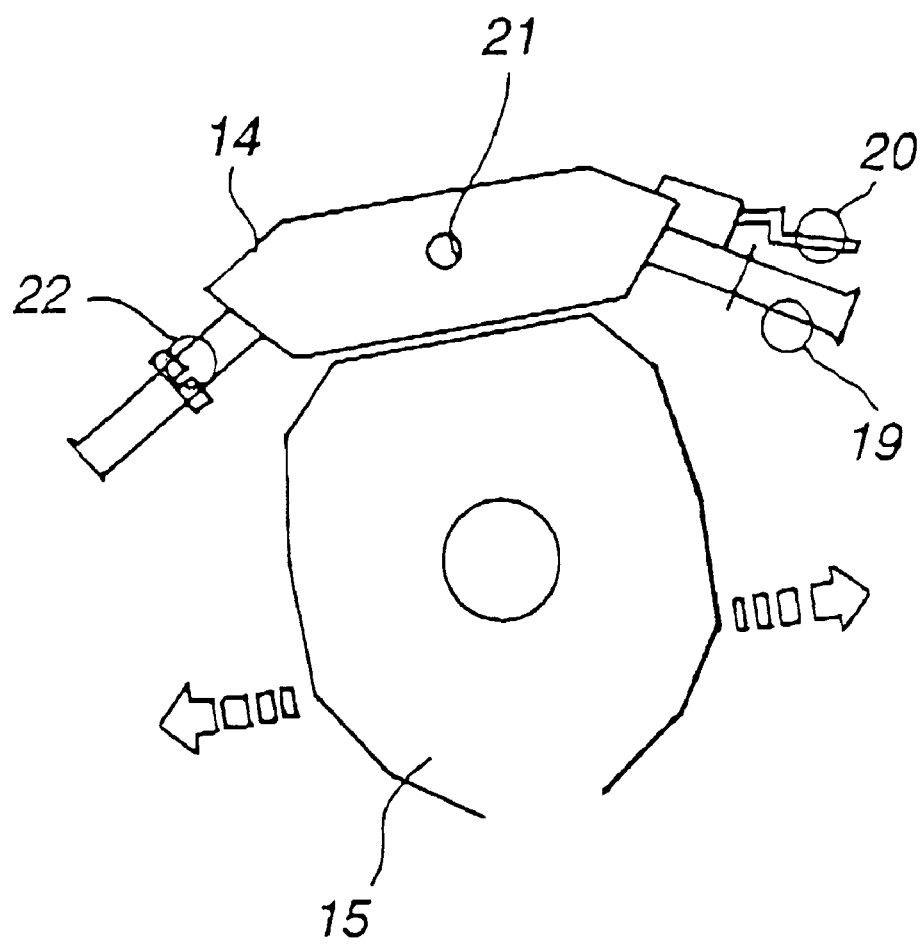
FIG. 2 is a plane view showing a portion of a motorcycle-type operating apparatus in the same embodiment.

Embodiments of the present invention are hereinafter explained with reference to the drawings. FIG. 1 is a perspective diagram showing an example of an embodiment of the game device for driving games according to the present invention. FIG. 2 is a plane view of the handle of the operating apparatus in the style of a motorcycle.

The game device 1 which employs an embodiment of the present invention is structured of, as shown in the diagram, an operating apparatus 2 resembling a shape of a motorcycle ("motorcycle-type operating apparatus") which mainly forms operation signals and also performs kick back motions, and a game machine main body 3 provided at the front side of this motorcycle-type operating apparatus 2. This game machine main body 3 is structured of a cage body 5 which is a rectangular parallelepiped of a prescribed size, a display 6 which is provided on one face of this cage body 5, a speaker 7 which composes a portion of the sound device provided inside this cage body 5, a motherboard 8 which is loaded with sound/game processing circuits provided inside this cage body 5, and other devices such as the power supply device not shown.

The display 6 of the game machine main body 3 is placed at the front side of the motorcycle-type operating apparatus 2. This display 6 is placed at the portion of the cage body 5 in a position such that the player may easily see such display upon riding the motorcycle-type operating apparatus 2.

The game processing portion within the sound/game processing circuit loaded on the motherboard 8 has a built-in computer device for performing previously stored game programs. The display 5 displays images accompanying the game progress according to game programs being performed in the game processing circuit. The sound device is composed of a speaker 7 and a sound circuit portion among the sound/game processing circuit, and generates sound signals accompanying the game progress in the game processing portion then generates sound by amplifying such signals at the sound circuit portion and providing the same to the speakers 7, 7.

The motorcycle-type operating apparatus 2 is electrically connected via the game machine main body 3 and cables not shown, and is capable of providing to the game machine main body 3 operation signals for moving the characters to be expressed in the game, and is further capable of receiving kick back driving signals and the like from the game machine main body 3.

This motorcycle-type operating apparatus 2 is basically composed of a base 10, a dummy body 13 of a motorcycle supported via supporting rods 11 and 12 on this base 10, various operation input devices, a kick back mechanism, and various lamps.

This dummy body 13 is structured to resemble the outer appearance of a motorcycle and comprises such shapes as a handle 14, a gas tank 15, a seat 16, a step 17, and an exhaust pipe 18. Moreover, although the dummy body 13 is normally maintained in the upright position, it can lean to the right and left (in the directions of arrows R and L) upon the player getting on the seat 16.

Near the right-hand tip of the handle 14 are provided a throttle grip 19 and a brake lever 20, and near the left-hand tip of the handle 14 is provided a punch or kick button (collectively "kick button") 21. Furthermore, at the center portion of the handle 14 is provided a start button or a view change button (collectively "view change button") 22. An operating board 23 is provided at the side of the supporting rod 11 located at the front side of the dummy body 13 and the preparation for starting a game is completed upon inserting coins in the coin slot (not shown) of the operating board 23.

A sensor for detecting the movement angle of the supporting rods 11 and 12 upon leaning the dummy body 13 in directions of arrows R and L is provided inside the base 10. The respective operation amounts of the throttle 19, the brake lever 20, and the supporting rods 11 and 12 may be output as operation-amount signals by a sensor. Moreover, the kick button 21 and the view change button 22 may be output as on-off signals by a switch. These signals are supplied to the game machine main body 3. The throttle grip 19 outputs acceleration/deceleration operation signals, the brake lever 20 outputs deceleration/stop signals, the kick button 21 outputs signals for punching and kicking, and the view change button 22 outputs signals for switching the viewpoint. Furthermore, the motorcycle-type operating apparatus 2 is able to generate instruction signals of turning rightward by leaning the dummy body 13 in the direction of arrow R in the diagram, and instruction signals of turning leftward by leaning the dummy body 13 in the direction of arrow L in the diagram.

The dummy body 13 of the motorcycle-type operating apparatus 2 is kicked back by the kick back mechanism not shown. This kick back mechanism is a mechanism which performs kick back motions by drive signals from the game processing circuit.

Figure 3:
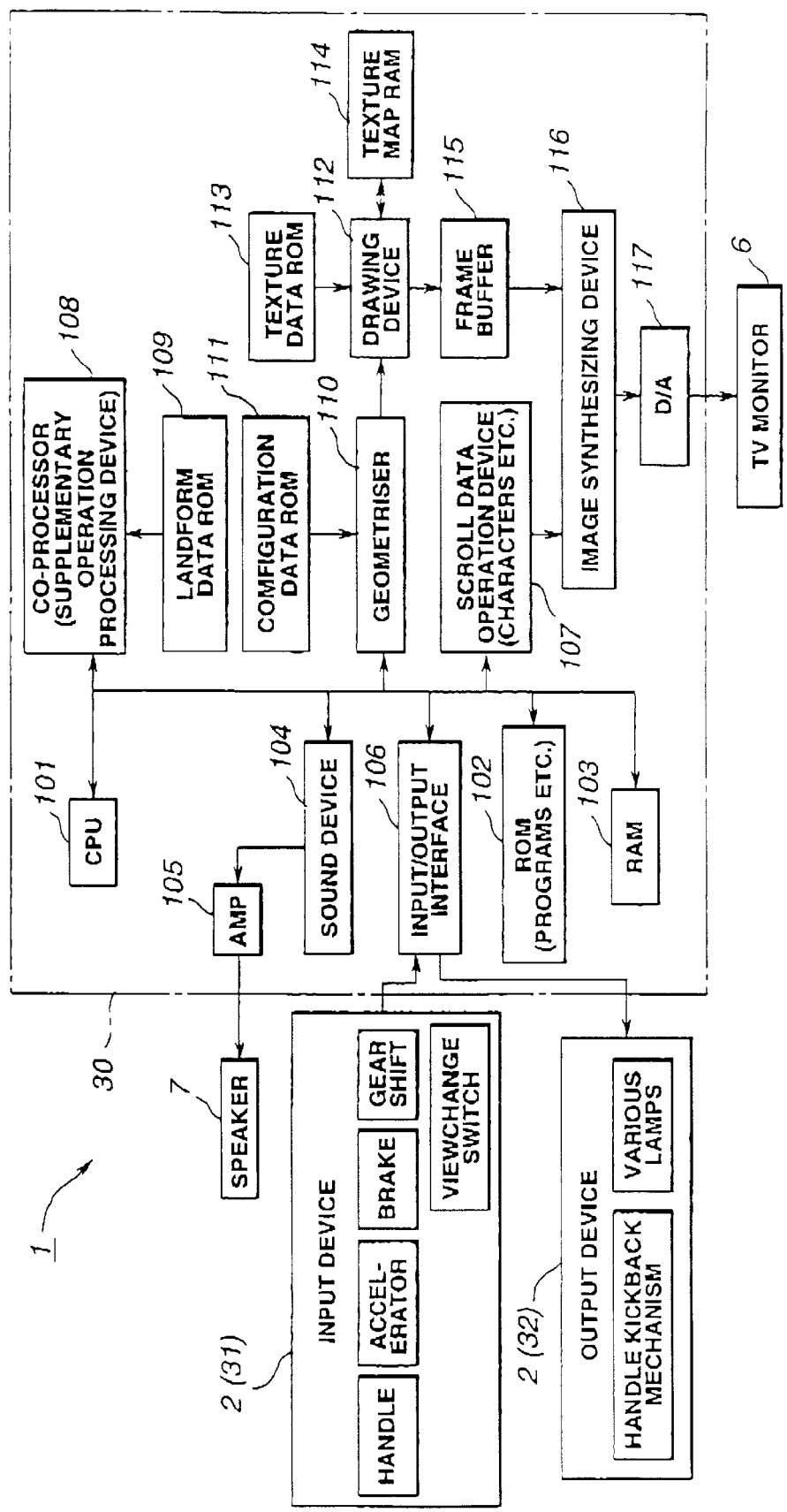
FIG. 3 is a block diagram showing the game device of the same embodiment.

FIG. 3 is a block diagram showing an example of one structure of a game processing circuit of a game device according to the present invention. This game device 1 comprises, as its basic elements, a motherboard 8 loaded with an audio/game processing circuit 30, a motorcycle-type operating apparatus 2 structured of an input device 31 and provided with an output device 32, a display 6, and a speaker 7.

An operation detection sensor for the throttle grip 19, operation detection sensor for the brake lever 20, switch for the kick button 21 and switch for the view change button 22 of the motorcycle-type operating apparatus 2 are respectively connected to the input/output interface 106 of the audio/game processing circuit 30. An output device 32 is connected to this input/output interface 106 of the audio/game processing circuit 30. This output device 32 has the kick back mechanism and various lamps. Although the display 6 used in the above embodiment was structured of a television receiver which displays images of driving games, a projector may be used in place of this television receiver as the display 6. The view change button 22 works as an actuator of a switch that changes the viewpoint of the virtual camera which displays the game field on the monitor. By operating this switch, for example, the viewpoint of the rider sitting on the seat 16 of the dummy body 13 or the viewpoint near the rider and the objective viewpoint viewing the players bike from a rear quarter are provided to the player.

The game processing portion within the audio/game processing circuit 30 has a CPU (central processing unit) 101 and is structured of a ROM 102, a RAM 103, a sound device 104, an input/output interface 106, a scroll data operation device 107, a co-processor (supplementary operation processing device) 108, a landform data ROM 109, a geometrizer 110, a landform data ROM 111, a drawing device 112, a texture data ROM 113, a texture map RAM 114, a frame buffer 115, an image synthesizing device 116, and a D/A converter 117. The audio circuit portion is structured of a power amplifying circuit (AMP) which power amplifies audio signals from the sound device 104.

The CPU 101 is connected to the ROM 102 which stores prescribed programs, the RAM 103 which stores data, the sound device 104, the input/output interface 106, the scroll data operation device 107, the co-processor 108, and the geometrizer 110 via bus lines. The RAM 103 functions for the buffer, and performs write-in of various commands to the geometrizer (e.g., display of objects) and write-in of matrices upon conversion matrix operations (e.g., scaling of clouds of dust to be explained later).

The input/output interface 106 is connected to the input device 11 and output device 12, which enables the operation signals from the handle of the input device 11 to be read in by the CPU 101 as digital amounts and the signals generated by the likes of CPU 101 to be output to the output device 32. The output of the sound device 104 is connected to the speaker 7 via the power amplification circuit (AMP) 105 and the audio signals generated by the sound device 104 are power amplified and then provided to the speaker 7.

In the example of the present embodiment, the CPU 101 reads in operation signals from the motorcycle-type operating apparatus 2 and, landform data from the landform data ROM 109 or landform data from the landform data ROM 111 ("objects such as the player's bike and enemy bike" and "three-dimensional data such as "backgrounds of roads, landforms, skies, spectators, buildings, etc.") performs at least a determination of the contact (collision) between the landform and the bike, semitransparent processing of scroll screens, determining processing of lock-on, action calculation (simulation) of cars upon collision determination between cars, transformation processing of shapes of objects, and path calculation of clouds of smoke as special effects.

Image processing of the motorcycle is for simulating the movement of motorcycles in the virtual space according to operation signals from the motorcycle-type operating apparatus 2, and after the coordinate values in the three-dimensional space are decided, a conversion matrix for converting such coordinate values to a viewpoint coordinate system and landform data (e.g., player's machine, opponent machines, landforms) are designated to the geometrizer 110. The landform data ROM 109 is connected to the co-processor 108. Therefore, predetermined landform data is provided to the co-processor (and the CPU 101). The co-processor 108 is mainly for determining the contact between the landform and motorcycle, and mainly undertakes the operation of floating decimal points upon such determination or action calculation of motorcycles. As a result, since the contact determination between the motorcycle and landform is implemented by the co-processor 108 and the result of determination is provided to the CPU 101, the calculation load of the CPU is reduced and, thus, the implementation of this contact determination is sped up.

The geometrizer 110 is connected to the shape data ROM 111 and the drawing device 112. Shape data of polygons (three-dimensional data such as motorcycles, landforms and backgrounds made from each of the apexes) is previously stored in the shape data ROM 111, and this shape data is provided to the geometrizer 110. The geometrizer 110 obtains data by perspectively converting shape data designated by the conversion matrix sent from the CPU 101 and converting the coordinate system to a view coordinate system in the three-dimensional space.

The drawing device 112 attaches texture to the shape data of the converted view coordinate system and outputs the same to the frame buffer 115. In order to attach this texture, the drawing device 112 is connected to the texture data ROM 113 and texture map RAM 114 as well as to the frame buffer 115. Moreover, polygon data is a group of data of relative or absolute coordinates of each of the apexes of a polygon (polygon: mainly triangles or quadrilaterals) made from a gathering of a plurality of apexes. Polygon data which is set in a relatively rough manner and sufficient for performing the contact determination of the motorcycle and landform is stored in the landform data ROM 109. On the other hand, polygon data which is set in a precise manner relating to the shape structuring the screen of motorcycles and backgrounds is stored in the shape data ROM 111.

The scroll data operation device 107 is for operating data of scroll screens of characters and symbols, and data of this scroll data operation device 107 and image data of the frame buffer 115 are synthesized at the image synthesizing device 116. Synthesized image data is converted to video signals at the D/A converter 117 and supplied to the display 6. By this, polygon screens (simulation effect) of motorcycles and landforms (backgrounds) temporarily stored in the frame buffer 115 and scroll screens of two-dimensional information which express characters of speed values and lap times and figures such as the course map and symbols two dimensionally are synthesized in accordance with the designated priority, and final frame image data is generated thereby. A synchronized signal is added to this image data, and thereafter becomes a video signal by being converted into an analog signal by the D/A converter 117. This video signal is supplied to the display 6 and an image of a driving game is displayed on the screen in real time.

Figure 4:
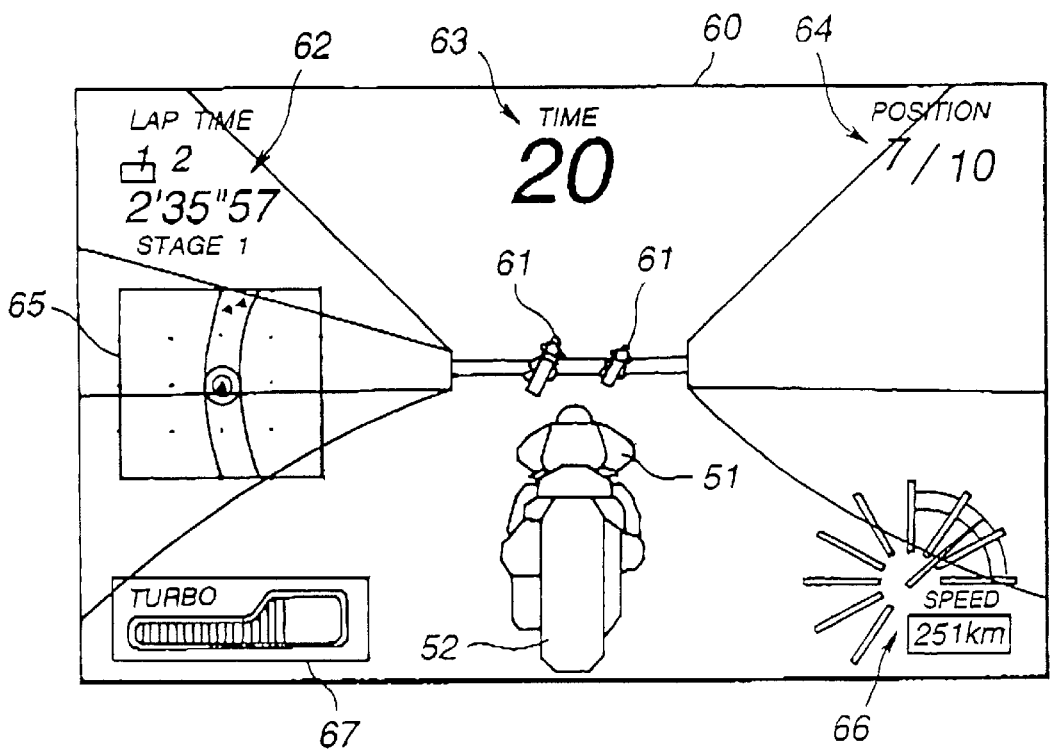
FIG. 4 is an explanatory diagram showing an example of a screen display when the distance between the player's bike and the enemy bike is long.
Figure 5:
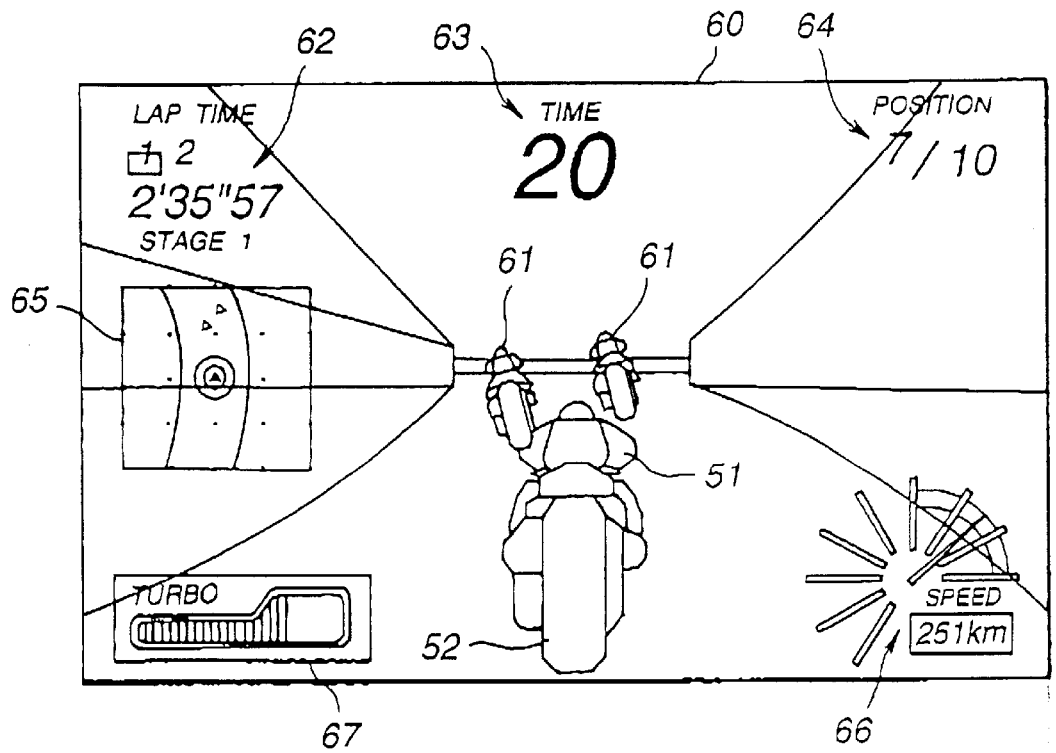
FIG. 5 is an explanatory diagram showing an example of a screen display when the distance between the player's bike and the enemy bike is mid range.
Figure 6:
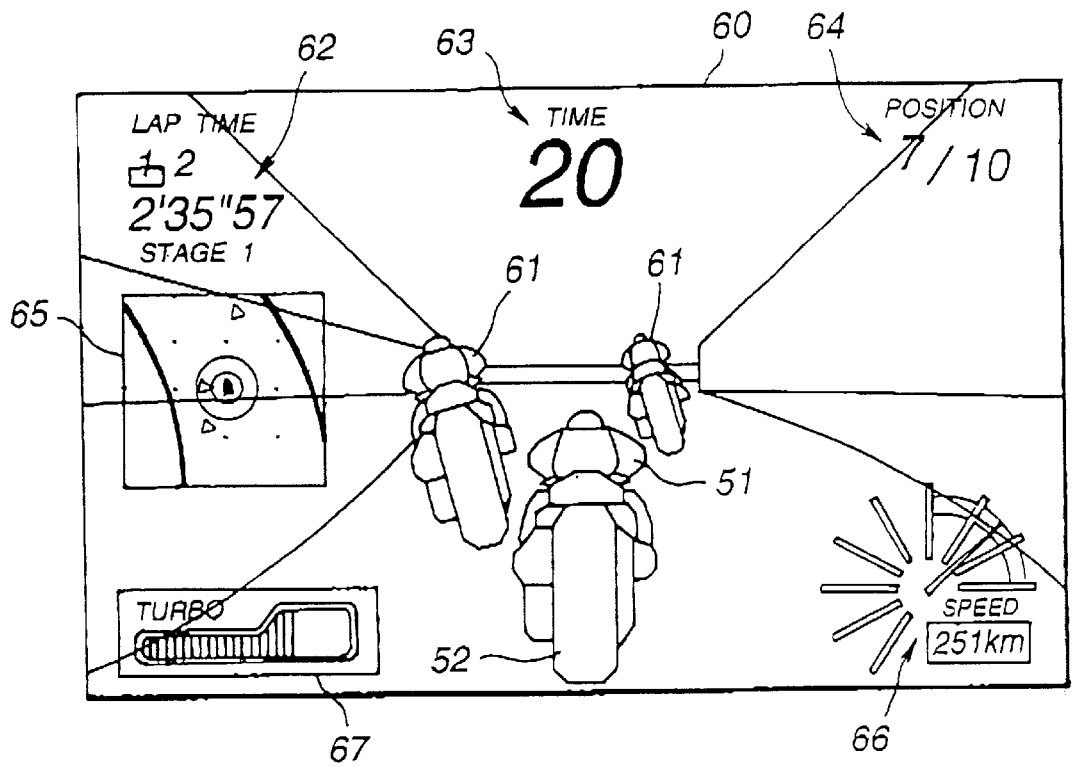
FIG. 6 is an explanatory diagram showing an example of a screen display when the distance between the player's bike and the enemy bike is short.

FIGS. 4 through 6 show examples to be displayed on the game screen 60 of the television monitor 6 of the above-mentioned driving game machine device.

In each of the drawings, the screen 60 is composed by synthesizing a two-dimensional image formed by the viewpoint from the virtual camera placed at the upper rear of the player character 51 placed in the virtual three-dimensional space and the image of the supporting information. The player character 51 is controlled by the player operating the motorcycle operation apparatus 2. Supporting information supports mainly the game play of the player by providing information relating to the game. As supporting information of games, for example, a lap time 62 of one lap of the course is displayed on the upper left of the screen, remaining seconds (time) 63 is displayed on the upper center of the screen, and the present rank 64 of the player is displayed on the upper right of the screen by image synthesis, respectively. Moreover, as supporting information, a radar 65 screen which is a small screen (supplementary screen) showing the shape of the race course and the positional relationship of the player's bike and the enemy bike (other bikes) thereof are displayed on the middle left of the screen, a turbo meter 67 (semitransparent processing) showing the workings of the turbo of the engine is displayed on the lower left of the screen, and a speedometer 66 (semitransparent processing) showing the speed of the player's bike is displayed on the lower right of the screen. The supporting information may be formed by the aforementioned scroll screen. Furthermore, preferably, the supporting information is displayed in a semitransparent manner such that the game screen behind such supporting information may be seen.

Figure 7:
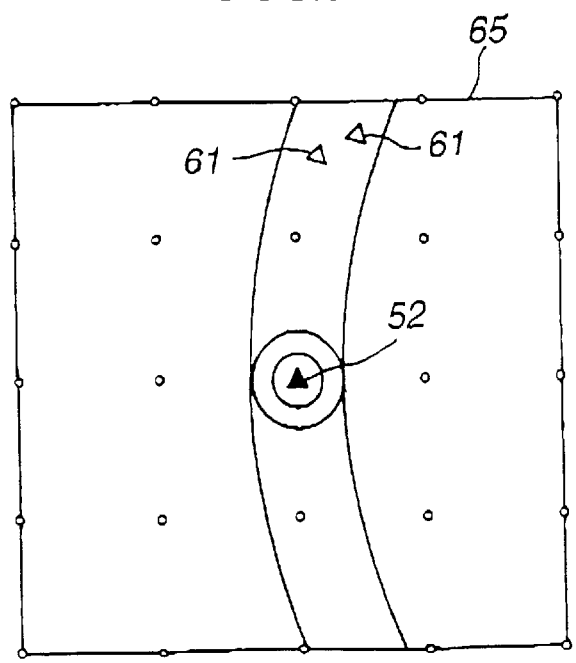
FIG. 7 is an explanatory diagram showing a display example of a radar screen 65 in the long distance mode.

FIG. 4 shows a picture of the player's bike 52 operated by the player chasing the enemy (enemy bike) 61. The shortest distance d between the player's bike 52 and the enemy bike 61 is, for example, 1000 m, and shows that the bikes are far apart. Here, the display magnification of the radar screen 65 shows circumstances of a wide area and is displayed relatively with a low magnification m1 (long distance mode). The enlarged radar screen 65 is shown in FIG. 7. The radar screen 65 is displaying an enemy bike 61, player's bike 52, and walls of the course. Other than this, although not shown, checkpoints and characters expressing other players during the competition mode may be displayed. This display usually displays the character of the player's bike in the center and a prescribed area of front, back, left and right thereof. The circumstances of the game progress, for example, when it is necessary to foresee the position (or distribution) of enemy bikes and especially the course itself, it is possible to display the player's bike off-center of the screen in an adequate manner. The prescribed distance range with the player's bike in the center is shown by a distance marker of a plurality of concentric circles.

Figure 8:
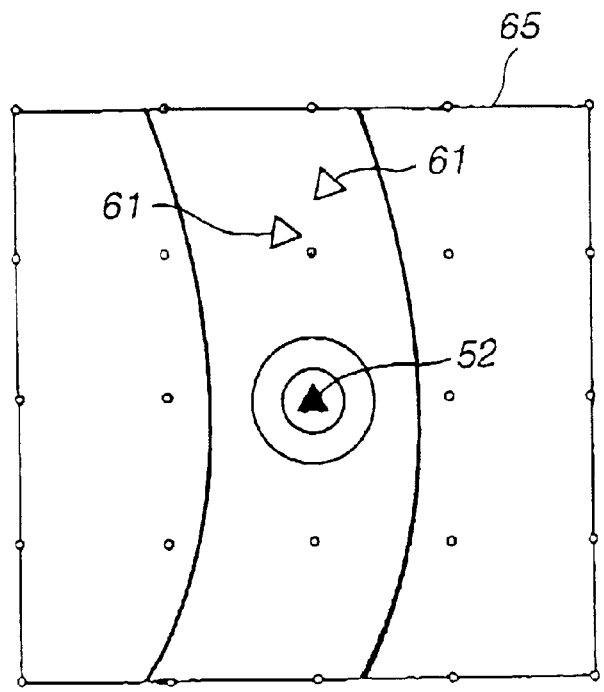
FIG. 8 is an explanatory diagram showing a display example of a radar screen 65 in the mid distance mode.

FIG. 5 shows a picture of the player's bike 52 operated by the player chasing the enemy bike 61. The shortest distance between the player's bike and the enemy bike is, for example, 300 m. The player's bike is much closer to the enemy bike in comparison with FIG. 4. Here, the display magnification of the radar screen 65 is set to an intermediate display magnification m2 (mid distance mode) for confirming the course shape and showing the relative position of the enemy bike. This is shown in FIG. 8. Moreover, portions of FIG. 8 that correspond to FIG. 7 have the same reference numerals and the descriptions thereof have been omitted.

Figure 9:
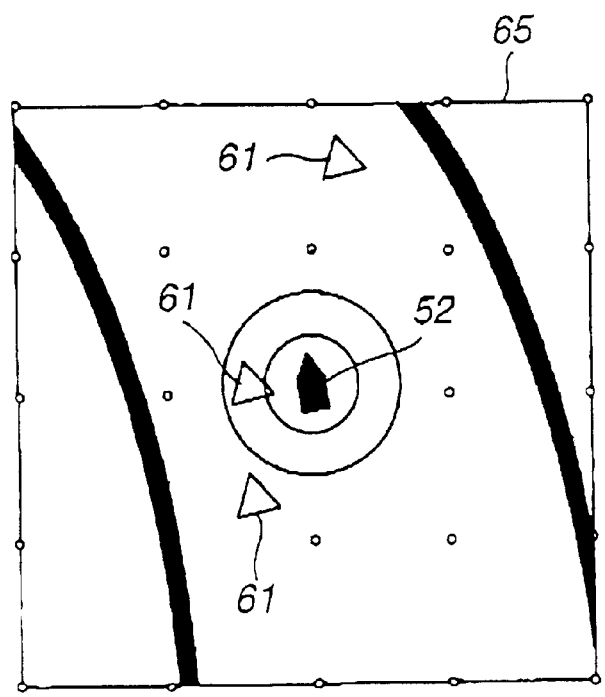
FIG. 9 is an explanatory diagram showing a display example of a radar screen 65 in the short distance (approach) mode.

FIG. 6 shows a picture of the player's bike 52 operated by the player chasing the enemy bike 61. The shortest distance between the player's bike 52 and the enemy bike 62 is 50 m, and the player's bike 52 is even closer to the enemy bike 61. Here, pursuant to game rules, the player's bike 52 may be attacked by the enemy bike 62. Furthermore, the display magnification of the radar screen 65 is set to a relatively high display magnification m3 (short distance mode) in order to make the judgment of the relative positions of the player's bike 52 and enemy bike 61 or the degree of danger impending on the player's bike easier. This is shown in FIG. 9. Moreover, portions of FIG. 9 that correspond to FIG. 7 have the same reference numerals.

In the scene on the screen 60 of FIG. 6, the enemy bike 61 is approaching the rear of the player's bike. Although this enemy bike 61 is not shown on the screen 60 since it is still out of view of the virtual camera, since it came into the radar display range (field), the enemy bike 61 is displayed at the rear left of the player's bike on the radar screen 65 (see FIG. 9).

Figure 10:
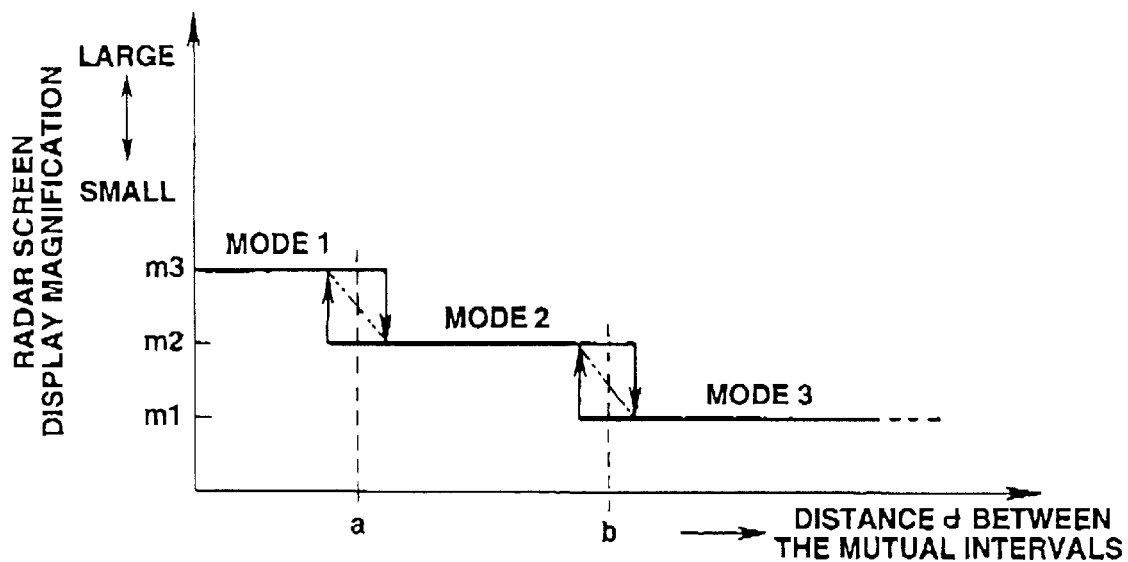
FIG. 10 is an explanatory diagram explaining the design upon switching the display magnification (enlargement, reduction) of the radar screen according to the distance between the player's bike and the enemy bike.

FIG. 10 is an explanatory diagram explaining the hysteretic movement upon switching the display magnification of the radar screen to be set in accordance with the shortest distance between the player's bike and the enemy bike.

In the illustrated example, for example, the display mode of the radar screen is set to the three modes corresponding to the mutual distance between the player's bike and the enemy bike, namely, approach mode 1, mid distance mode 2, and long distance mode 3. The display magnification of enlargement/reduction is set to m3 during the approach mode 1, m2 during the mid distance mode and m1 (m3>m2>m1) during the long distance mode.

Then, when the estranged distance between the player's bike and the enemy bike exceeds a reference a, the approach mode 1 transfers to the mid distance mode 2 at a point wherein the standard a is further exceeded by a predetermined value (e.g., a value 110% of the reference value a). Furthermore, when the estranged distance exceeds a reference b during the mid distance mode 2, the mid distance mode 2 transfers to the long distance mode 3 at a point wherein the reference value b is further exceeded by a predetermined value (e.g., a value 110% of the reference value b). On the contrary, when the estranged distance between the player's bike and the enemy bike decreases beyond a reference value b in the long distance mode 3, the long distance mode 3 transfers to the mid distance mode 2 at a point wherein the reference value b is further decreased by a predetermined value (e.g., a value 90% of the reference value b). Furthermore, when the estranged distance decreases beyond a reference value a in the mid distance mode 2, the mid distance mode 2 transfers to the approach mode 1 at a point wherein the reference value a is further decreased by a predetermined value (e.g., a value 90% of the reference value a).

Accordingly, by shifting the threshold value of the display mode between the increasing tendency and the decreasing tendency of the estranged distance, it is possible to avoid a difficult-to-see screen upon the frequent mode switching of the radar screen which occurs when the estranged distance sways in the vicinity of the threshold value. Whether the estranged distance has an increasing tendency or a decreasing tendency may be determined by comparing the estranged distance which was previously calculated and the estranged distance which was presently calculated.

Figure 11:
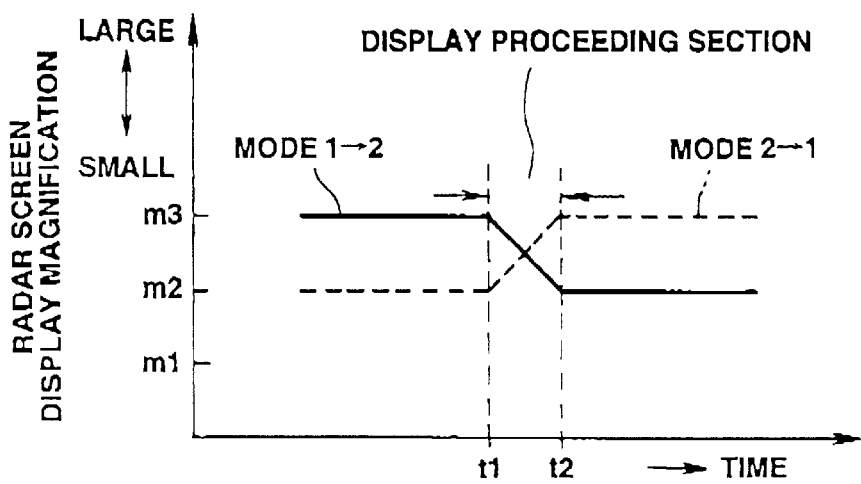
FIG. 11 is an explanatory diagram explaining an example of the display being shifted naturally by gradually changing the display magnification upon switching the display of the radar screen.

FIG. 11 is an explanatory diagram explaining an example showing the natural transfer of the display mode which continuously changes the display magnification of the radar screen from one value to another upon switching between the mutual display modes of the display screen.

For example, when the current display mode is the approach mode 1 and a mode change to a mid distance mode due to the decrease of the estranged distance is determined, the display magnification m3 is gradually reduced from time t1 and, when it becomes a prescribed display magnification m2 during time t2, stops the decrease of the display magnification. On the contrary, when the current display mode is the mid distance mode 2 and the change to an approach mode is determined, the display magnification m2 is gradually increased from time t1 and, when it becomes a prescribed display magnification m3 during time t2, stops the increase of the display magnification.

Figure 12:
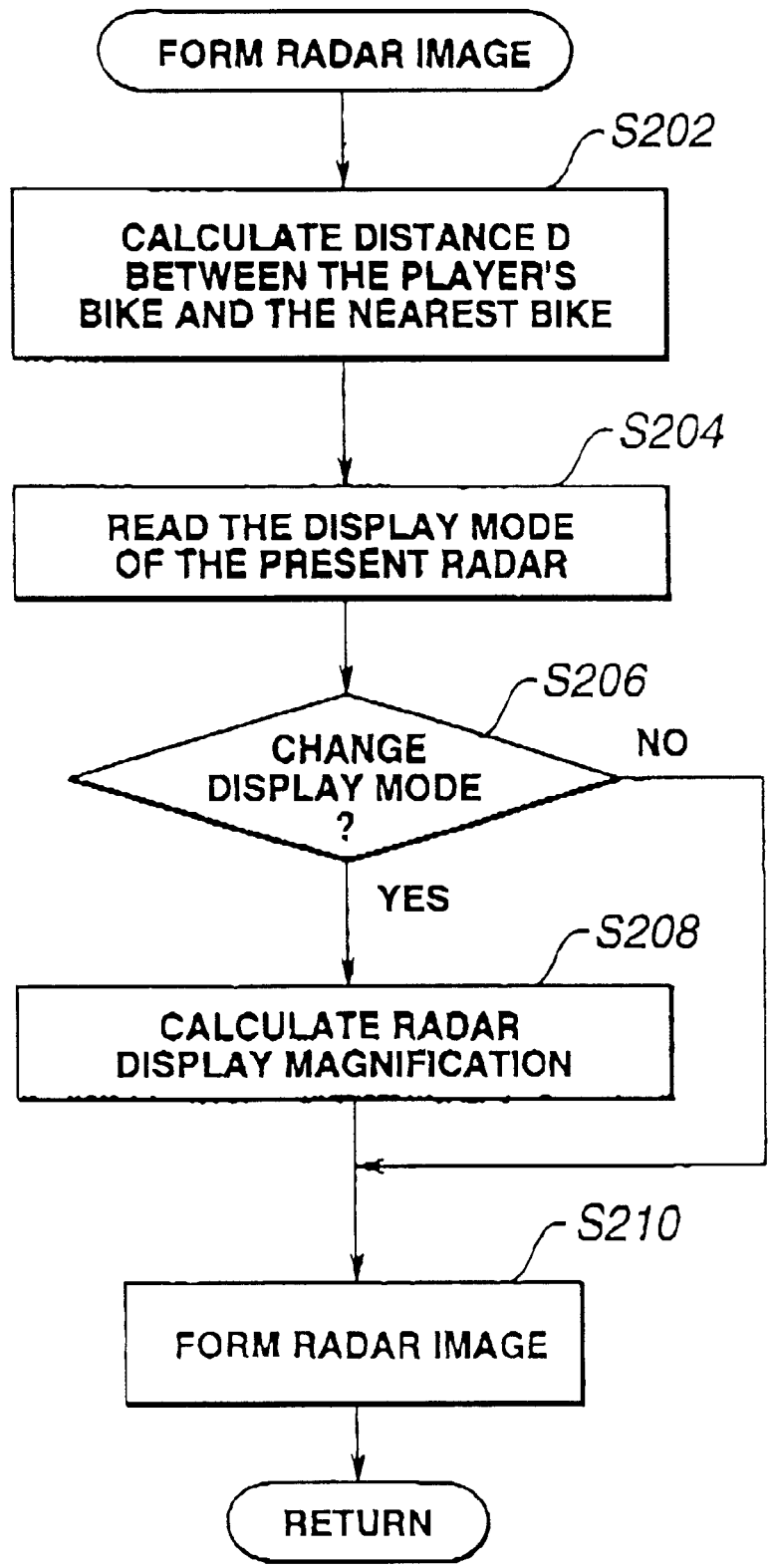
FIG. 12 is a flowchart explaining the algorithm of forming the display image.

FIG. 12 is a flowchart explaining the control algorithm of display magnification switching of the radar screen.

Foremost, by setting the display magnification in correspondence with the present display mode of the radar screen to the internal condition register, the CPU 101 makes the radar screen forming routine (not shown) display the surrounding situation of the player's bike with the scope of a course map corresponding to the display magnification. The CPU 101 distinguishes whether or not the radar screen is to be displayed at the condition branch of the radar image formation during the main control program not shown, and implements the control algorithm of the illustrated flowchart.

The CPU 101 calculates the distance between the player's bike and each of the plurality of enemy bikes respectively in the virtual three-dimensional game space. The shortest distance among the plurality of distances is abstracted (S202). The current display mode of the radar screen is read out from the inner condition register (S204). This condition register has indispensable parameters for the game progress, and the parameter includes the current display mode of the radar screen. The switching of the display mode of the radar screen is determined by the mutual distance between the player's bike and the enemy bike, and the current mode (S206). When the display mode is not switched (S206; No), the radar image is formed with the current enlargement ratio (S210).

When switching the display mode (S206; Yes), the display magnification of the radar screen in the video frame is calculated (S208). Upon switching the display mode, it is preferable to perform the hysteretic movement as explained with reference to FIG. 10. The calculation of the display magnification, for example, is stored previously in the memory as in the table of FIG. 10 which sets forth the screen display magnification D(=f(d)) by the current display mode (approach mode 1, mid distance mode 2, long distance mode 3) and the distance d between the player's bike and the nearest enemy bike, and is referred to by such distance d. The above table is introduced into the memory upon reading in data of application software provided by the CD-ROM.

Upon changing the display magnification, it is desirable that such display magnification is slowly changed as shown in FIG. 11. An example of such display magnification is explained below.

When the enlargement ratio of the current radar screen of a certain frame image is set to Wo, the enlargement ratio of the mode of the place of transfer is set to W', and the degree of enlargement is set to a transfer promotion ratio α (e.g., 0.05), the radar enlargement ratio W of the next frame is expressed by W=Wo+α(W'−Wo). Similarly, the reduction ratio is expressed by W=Wo−α(Wo−W'). Either this enlargement ratio or reduction ratio is set as the display magnification of the frame (S209).

The radar image is formed by using this display magnification as the parameter for forming images (S210). This is altered in correspondence with the display magnification in which the display scope of the course map to be displayed on the small screen is set.

Moreover, as shown with the two point chain line in FIG. 10, a similar effect may be expected by making the display mode switching zone in the characteristic of the function D=f(d) of the display magnification into a slope characteristic.

After the image is formed, it returns to the main program. The formed radar image is synthesized with the camera image and is displayed on the monitor screen 6. This processing is repeated in the frame cycle of the video signal.

In this embodiment, although the distance between the player's bike and the enemy bike (parameter of the distance between the bikes) is the opportunity of display switching of the radar screen (small screen), it is not limited thereto. For example, the display magnification of the radar screen may be switched by the speed of the player's bike (speed parameter). Normally, when cruising at a fast speed, it is necessary to know the condition of the course ahead.

Furthermore, the display magnification of the radar screen may be switched in accordance with the condition (characteristic parameter of the course) of the course (map) which the player's bike enters into. For example, upon nearing a curve which is difficult for the player's bike to corner and the distance between the player's bike and the entrance of such curve reaches a prescribed distance, the entire shape of the curve from the entrance to the exit is informed to the player by showing the existence of the curve ahead of time with the radar screen displaying a wide area to the player. In addition, upon the player's bike approaching a curve, a radar screen which has been expanded relatively and displaying a small area is used to inform the detailed shape of the curve to the player.

Furthermore, if an event occurs at a position not displayed on the game screen during the game progress, for example, the display reduction of the small screen may be changed pursuant to the distance between the place of such event and the position of the player's bike in order for the player to easily grasp the relationship between the place where such event occurred and the player's bike.

Moreover, conditions to switch the display magnification of the radar screen and the like may be combined thereto.

Other embodiments of the present invention are now explained with reference to FIGS. 13 through 16.

Figure 13:
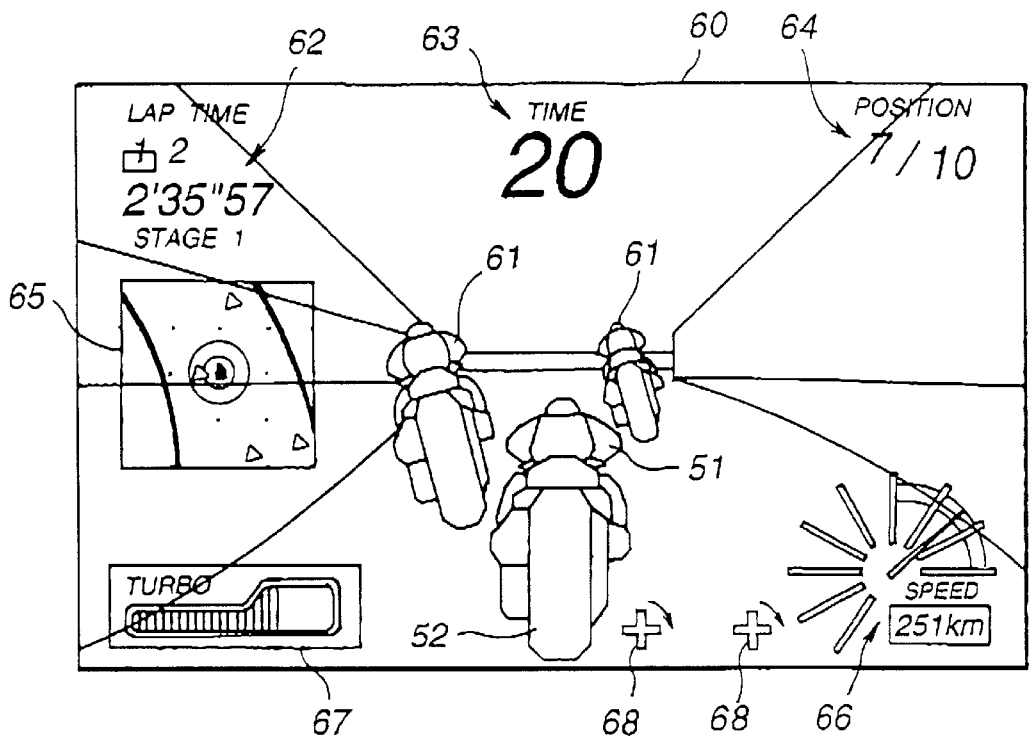
FIG. 13 is an explanatory diagram showing an example of a checkmark being displayed which informs the player that an enemy bike is approaching in the rear of the screen.
Figure 14:
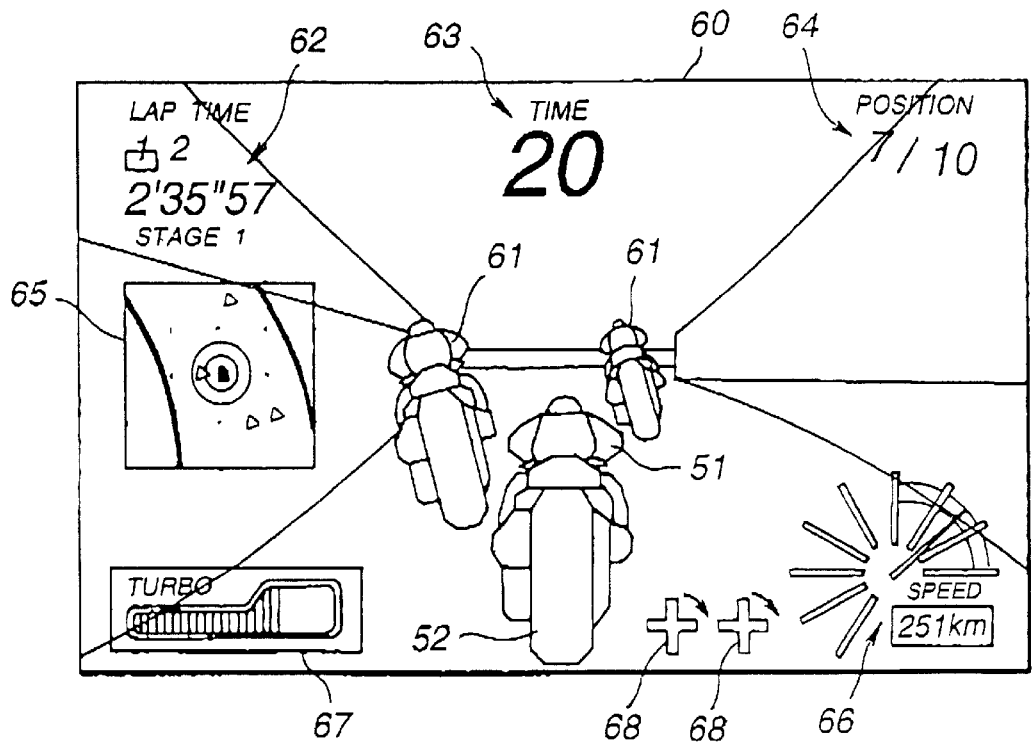
FIG. 14 is an explanatory diagram showing an example of a checkmark being displayed which informs the player that an enemy bike is approaching in the rear of the screen, wherein the enemy bike is closer to the player's bike compared to FIG. 13.

In the example shown in FIGS. 13 and 14, the enemy bike approaching the rear of the player 51 is displayed with a "cross-shaped" checkmark 68 at the bottom of the screen 60 as a symbol expressing the enemy bike. Although the estranged distance between the player's bike and the enemy bike in the radar screen 65 of each of the diagrams is shown, the checkmark 68 which is a symbol expressing the enemy bike is set to a size in accordance with the distance from the player 51. In other words, when the player's bike and the enemy bike are apart, the outer shape of the mark 68 is small, and when the bikes approach each other, the outer shape of the mark 68 is displayed large. Moreover, the display position of the checkmark 68 in the horizontal direction of the screen 60 is displayed in accordance with the position in the lengthwise direction of the racecourse within the virtual space. The checkmark 68 is displayed in a semitransparent manner such that it will enable the player to see the rear thereof and, therefore, not being an obstruction in itself. Furthermore, it rotates in the clockwise direction and arouses attention in the rear direction of the player. This checkmark functions as the rear radar displaying the conditions in the rear. The rotation speed of the checkmark may be set in accordance with the approaching level of the rear enemy bike or the dangerousness level of the enemy.

The checkmark 68 may be shaped as a polygon such as a triangle or quadrilateral, a vehicle, a face of a character or other various shapes and may be designed in accordance with the types of bikes and enemies approaching from the rear.

Figure 15:
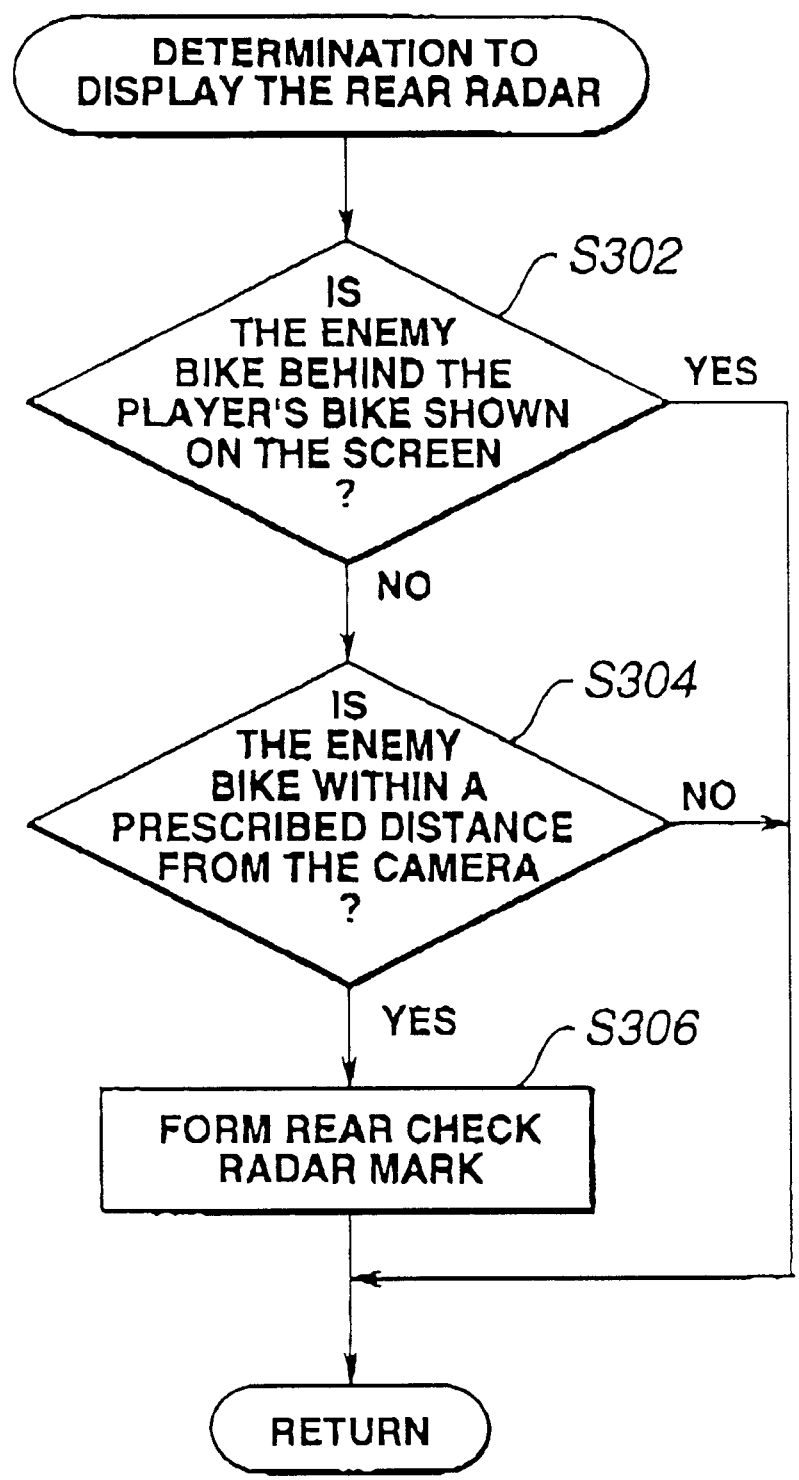
FIG. 15 is a flowchart explaining the algorithm which displays the checkmark in the rear of the screen.

FIG. 15 shows the display algorithm of the rear checkmark. In the main program not shown, a plurality of vehicles are running on the racecourse and, when the virtual camera is following from the rear position (e.g., objective view) of the player, the CPU 101 performs the routine shown in FIG. 15.

Figure 16:
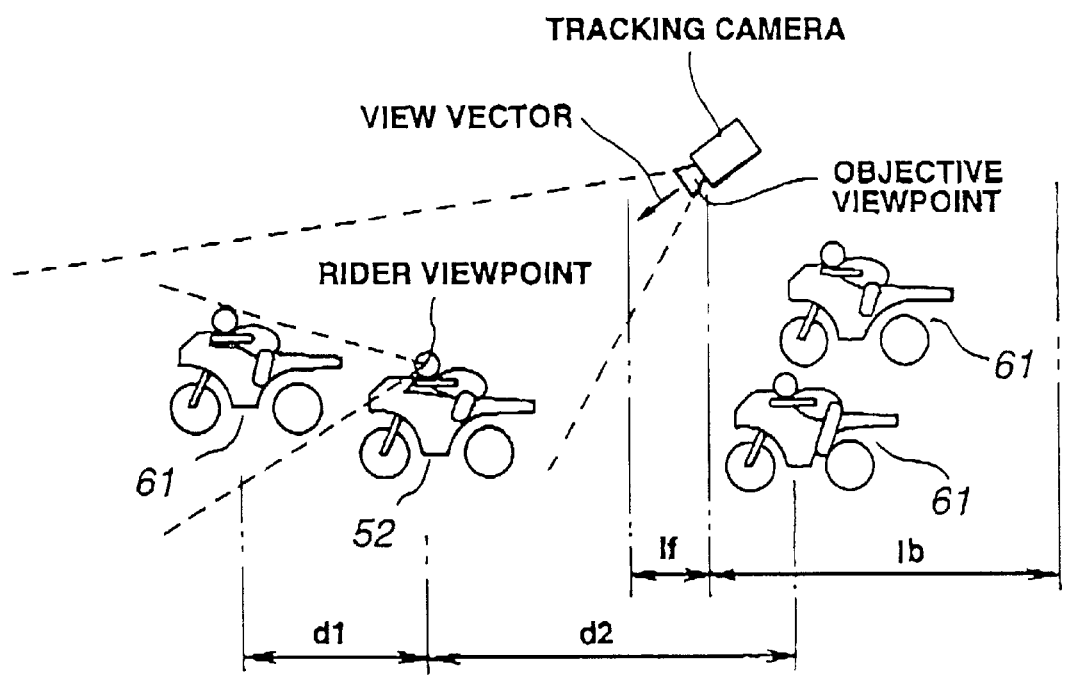
FIG. 16 is an explanatory diagram explaining the relationship between the position of the virtual camera and the enemy bike in the rear.

As shown with the dotted lines in FIG. 16, it is determined whether an enemy bike 61 positioned behind the player's bike 52 is within the screen (view) captured by the virtual camera (S302). If the enemy bike 61 is already shown on the screen 60, it is not necessary to display a rear checkmark 68 since the enemy bike 61 may be seen as an image. The display routine of the rear checkmark is finished thereby (S302; Yes).

If the enemy bike 61 behind the player's bike 52 is not shown on the screen (S302; No), it is determined whether the enemy bike 61 exists within a prescribed distance range from the virtual camera of the player's bike 52. A prescribed distance is, for example, lf[m] (e.g., 50 m) in front of the camera and lb[m] (e.g., 100 m) behind the camera (S304). If the enemy bike 61 does not exist within the prescribed distance (S304; No), the present routine is finished because there is no reason to display the rear checkmark.

If the enemy bike 61 exists within the prescribed distance (S304; Yes), the distance d2 in the virtual space between the player's bike 52 and the enemy bike 61 in the rear is calculated. Moreover, this distance may also be calculated in terms of the distance between the position of the virtual camera and the enemy bike 61 in the rear. The estranged distance d2 between each of the plurality of enemy bikes existing within the prescribed distance is calculated. Checkmarks 68 are provided for each of the enemy bikes 61 and the size of each of the checkmarks 68 is set forth in correspondence with the estranged distance d2. This checkmark rotates in a prescribed angle. Furthermore, the display position of the leftward and rightward directions of the screen (horizontal direction) of each checkmark 68 is set forth in correspondence with the position in the lengthwise direction of the pertinent enemy bike 61. Each of the checkmarks 68 formed in this way is synthesized with the background image by the image synthesizing device 116 (S306). Thereafter, it returns to the main program.

Such processing shall be performed for each frame whereby the respective size and display position corresponding to the distance and position of the player's bike 52 and enemy 61 are set, and an image wherein a rotating checkmark 68 is added thereto is displayed.

Normally, in a system wherein the game is proceeded by the player operating the object placed in this type of three-dimensional virtual space, a game is advanced by displaying an image seen from a virtual camera within such three-dimensional space on the screen of a display device. In order to make the game easier for the player to play, many of the games have an additional function of changing the position of the virtual camera and displaying the image thereof on a display screen. It is possible to provide the player with an image from the position selected by the player For example, a rider viewpoint as the first viewpoint position and the objective viewpoint as the second viewpoint position It goes without saying that it is possible to place a virtual camera at a third viewpoint position or an arbitrary viewpoint position to follow the movement or the like of vehicles.

Generally, the position of the virtual camera which makes the game operation easier for the player is the objective viewpoint position wherein the camera is positioned at a position slightly behind the player's bike 52. In such case, the player's bike 52 in its entirety and the surrounding conditions thereof are displayed on the display device, that is, the screen 60 of the monitor 6. On the contrary, when desiring a more realistic game, a rider viewpoint position wherein the virtual camera is set at the eye level of the player character 51 in the virtual space is preferred. In the case of such rider viewpoint position, basically, the frontward direction of the player's bike 52 can only be seen by the camera, and the player is unable to know the situation behind the player's bike 52 with the game screen 60. Particularly, in a game wherein the player may be attacked by the enemy bike 61 appearing from the rear as mentioned above, the player will be attacked from behind which is not shown on the display screen and, therefore, is extremely disadvantageous to the player. Thereby, it is desirable that information regarding the approach of the enemy bike 61 from the rear is displayed. Moreover, in the case of an objective viewpoint, since the surrounding of the player's bike 52 is displayed to a certain extent, it may be better that such information is not displayed. Thus, the display of the information in accordance with the selected camera viewpoint is controlled.

Figure 17:
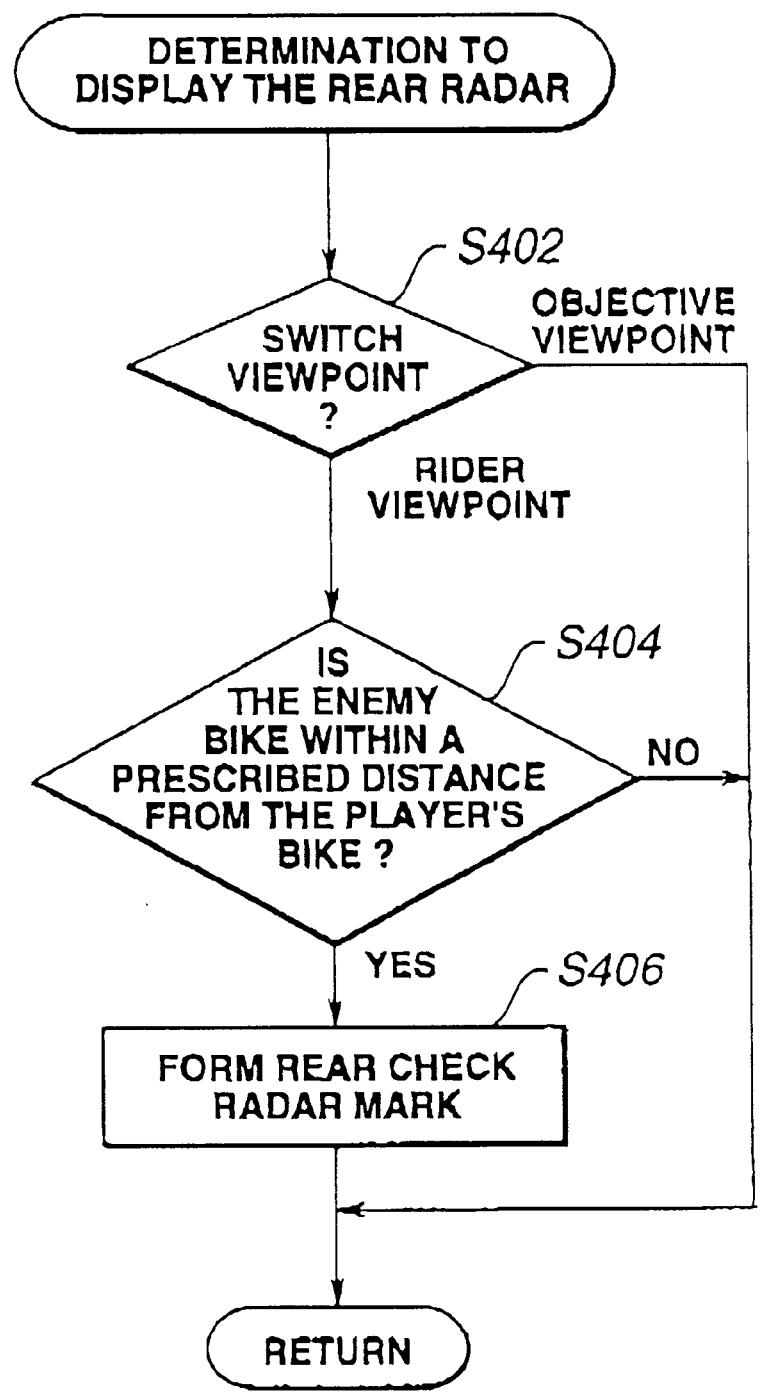
FIG. 17 is a flowchart explaining other algorithms which display rear checkmarks on the screen.

FIG. 17 shows the display algorithm of the rear checkmark 68 in connection with the viewpoint switching in such situation.

When the viewpoint switching switch 22 is operated by the player, a viewpoint switching flag is set to the condition register not shown via the input/output interface 106. When the position data of the virtual camera is changed in the virtual space by this viewpoint switching switch, the parameter of the conversion matrix which performs coordinate conversion is renewed by a new data of the camera position. In other words, data of each object placed within the virtual space is converted to a viewpoint coordinate system of the view in correspondence with the position after such change.

Thereafter, it is converted to a screen coordinate system by perspective transformation, rendering is performed, and the game screen 60 of the monitor 6 switches to a screen in correspondence with the position and view vector of the new virtual camera.

Furthermore, the switching of the viewpoint is not limited to the operation of the viewpoint switching switch 22. For example, the CPU may perform viewpoint switching in correspondence with an occurrence of a specific event.

When the CPU determines to set the viewpoint switching flag in the main program not shown, it implements the routine shown in FIG. 17.

Foremost, it is determined whether the viewpoint position of the virtual camera designated by the view switching is a rider viewpoint or an objective viewpoint (S402). If the camera viewpoint is an objective viewpoint, since it is possible to show the enemy bike 61 in the rear to a certain extent on the game screen 60 (the enemy bike 61 existing behind the player's bike 52 and within a certain range in the vicinity of such player's bike comes within the view range of the virtual camera positioned in the upper rear of the player's bike 51 and is shown on the game screen 60), the routine is finished without forming a rear checkmark 68 (S402; objective viewpoint).

If it is a rider's viewpoint (S402; rider viewpoint), since the rear of the player's bike 52 will not be shown on the game screen 60, it is determined whether an enemy bike exists within a prescribed distance from the rear of the player's bike 52 or such enemy bike exists within a prescribed range from the virtual camera (S404). If an enemy bike 61 does not exist within a prescribed distance, within 150 m from the rear of the player's bike for example (S404; No), the present routine is finished because it is not necessary to display the rear checkmark 68.

If an enemy bike exists within a prescribed distance (S404; Yes), the estranged distance d2 in the virtual space between the player's bike 52 and the enemy bike 61 in the rear within such prescribed distance is calculated. Furthermore, this distance may also be calculated as a distance between the position of the virtual camera and the enemy bike 61 in the rear. The estranged distance d2 for each of the enemy bikes 61 existing within the prescribed distance is calculated. The checkmarks 68 are prepared for each of the enemy bikes 61 and the size of each of the checkmarks 68 is set forth in correspondence with such distance. This checkmark 68 is rotated clockwise in a prescribed angle. Moreover, the display position of the leftward and rightward direction of the screen (horizontal direction) of each checkmark 68 is set forth in correspondence with a position in the lengthwise direction of the racecourse of each enemy 61, or a position in the leftward and rightward direction (coordinate x) in a viewpoint coordinate system. Each of the checkmarks formed in this way is synthesized with the background image by the image synthesizing device 116 (S406). Thereafter, the CPU 101 returns to the main program.

Since steps S404 and S406 respectively correspond to steps S304 and S306, selecting of the rider viewpoint at step S402 may be transferred to steps S302 and S304 in the program.

By performing such processing for each frame, a checkmark expressing the distance/position of the player's bike and enemy bike in the rear is adequately displayed on the game screen upon progressing the game in the rider viewpoint mode. Accordingly, the disadvantage during the rider viewpoint mode wherein the rear of the player's bike cannot be seen is diminished However, the present invention is not limited to the rider viewpoint mode. For example, it may also be a camera position other than the rider viewpoint wherein the frontward direction of the player's bike may be seen but the rear thereof is not shown (or difficult to show).

Figure 18:
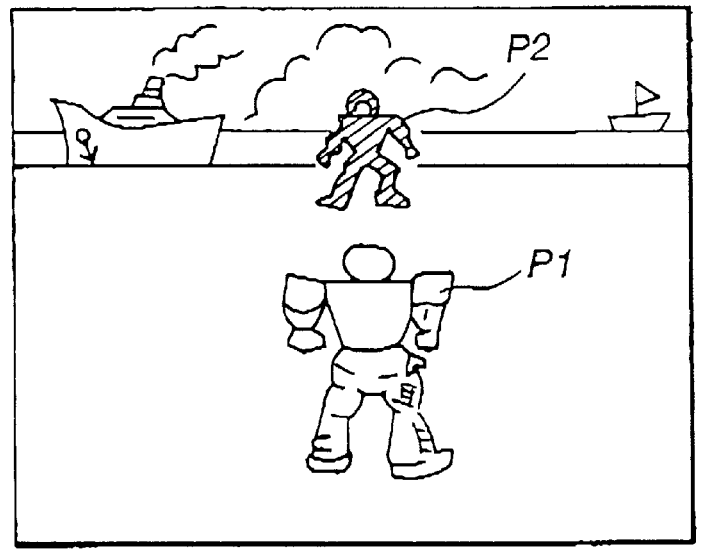
FIG. 18 is an explanatory diagram explaining an example of another object.
Figure 18:
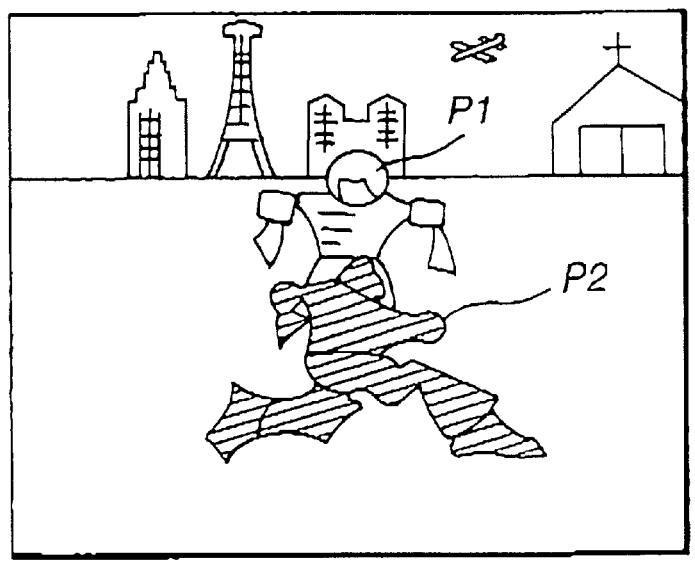

Furthermore, although it was explained in the above embodiment wherein the example of the object was a motorcycle, it is not limited thereto. For example, as shown in FIG. 18 (A) and (B), it may be a robot P1 operated by the player and a robot P2 operated by a computer or an opponent. The aforementioned small screen (not shown) is displayed in this screen. In addition, four-wheeled vehicles, tanks, battle planes, helicopters, motor boats, jet skis, skis, snowboards, sleds, human beings, animals and game characters or the like may be used as objects.

Although programs and data of the game device was provided by a ROM in the Embodiments, it may also be of other information recording mediums, such as an FDD, CD-ROM, DVD, HDD, and the like. Moreover, programs and data may also be downloaded via a communication net such the internet or other communication lines.

As explained above, according to the game device and the image displaying method of a game device of the present invention, since a small screen within the game screen which displays the surrounding condition of the player's machine (or object) is displayed on the monitor screen with a display magnification or display scale in accordance with the various conditions such as the distance between the player's machine and the enemy machine, it is preferable in that the player is able to grasp the course condition or the positional relationship with the other machines due to such small screen.

Furthermore, since the enemy machines in the rear which are not shown on the screen are displayed as rear checkmarks in the game screen, it is convenient upon playing the game in conditions wherein the rear of the player's machine is not shown on the screen due to changes etc. in the camera viewpoint.

what is claimed is:

1. A game device which displays on a monitor screen a picture of a game being proceeded in a virtual space by a first object controlled by a player and a second object controlled by a computer or an opponent, comprising:

a support screen forming circuit for forming in said monitor screen a small screen displaying information which supports the control of said first object;

a display mode alteration distinguishing circuit for distinguishing whether or not a condition falls under a prescribed condition to alter the display magnification of said small screen during the game progress in said virtual space; and a display magnification setting circuit for setting the display magnification of information in said small screen pursuant to a distinction result of said distinguishing circuit;

wherein said prescribed condition is a distance between said first object and said second object exceeding a reference value.

2. A game device according to claim 1, wherein said display magnification setting circuit, upon setting said display magnification, gradually moves said display magnification from a present value to the display magnification to be set.

3. A game device according to claim 1, wherein said small screen includes a course map and said display magnification setting circuit sets a reduced scale of said course map according to said distance.

4. A game device which displays on a monitor screen a picture of a game being proceeded in a virtual space by a first object controlled by a player and a second object controlled by a computer or an opponent, comprising:
  a support screen forming circuit for forming in said monitor screen a small screen displaying information which supports the control of said first object;
  a display mode alteration distinguishing circuit for distinguishing whether or not a condition falls under a prescribed condition to alter the display magnification of said small screen during the game progress in said virtual space; and
  a display magnification setting circuit for setting the display magnification of information in said small screen pursuant to a distinction result of said distinguishing circuit; wherein said prescribed condition is a moving speed of said first object exceeding a reference value.

5. A game device according to claim 4, wherein said display magnification setting circuit, upon setting said display magnification, gradually moves said display magnification from a present values to the display magnification to be set.

6. A game device according to claim 4, wherein said small screen includes a course map and said display magnification setting circuit sets a reduced scale of said course map according to said distance.

7. A game device which displays on a monitor screen a picture of a game being proceeded in a virtual space by a first object controlled by a player and a second object controlled by a computer or an opponent, comprising:
  a support screen forming circuit for forming in said monitor screen a small screen displaying information which supports the control of said first object;
  a display mode alteration distinguishing circuit for distinguishing whether or not a condition falls under a prescribed condition to alter the display magnification of said small screen during the game progress in said virtual space; and
  a display magnification setting circuit for setting the display magnification of information in said small screen pursuant to a distinction result of said distinguishing circuit; wherein said prescribed condition is whether or not said first object moved to a predetermined position in said virtual space.

8. A game device according to claim 7, wherein said display magnification setting circuit, upon setting said display magnification, gradually moves said display magnification from a present values to the display magnification to be set.

9. A game device according to claim 7, wherein said small screen includes a course map and said display magnification setting circuit sets a reduced scale of said course map according to said distance.

10. An image displaying method of a game device which displays on a monitor screen a picture of a game being proceeded in a virtual space by a first object controlled by a player and a second object controlled by a computer or an opponent, comprises:
  a small screen forming step for forming in said monitor screen a small screen displaying a surrounding situation of said first object;
  a distinguishing step for distinguishing whether or not a condition falls under a prescribed condition to magnify or reduce the display of said small screen during the game progress in said virtual space; and
  a display altering step for altering the display of said small screen to be magnified or reduced upon falling under said condition; wherein
  said prescribed condition is at least one among:
    (a) a distance between the first object and the second object exceeding a reference value;
    (b) a moving speed of the first object exceeding a reference value;
    (c) the first object moving to a predetermined position in the virtual space; and
    (d) whether or not a predetermined event occurred in the virtual space.

11. An image displaying method of a game device according to claim 10, wherein said display altering step further gradually magnifies or reduces an outer frame of the field including said first object displayed on said small screen without changing the overall size of said small screen by gradually changing the display magnification of said small screen.

12. An image displaying method of a game device according to claim 10, wherein said small screen forming step further displays said first object and said second object as symbols on a course map of a game, and said display altering step further sets a reduced scale of said course map according to a distance between said first object and second object.

13. A computer-readable recording medium comprising:
  a program for controlling a computer, which reads the computer-readable recording medium, to cause the computer to perform the functions of forming in a monitor screen a small screen displaying information which supports control of a first object, distinguishing whether or not a condition falls under a prescribed condition to alter a display magnification of information in said small screen during progress of a game in a virtual space, setting a display magnification of said small screen pursuant to the distinguishing whether or not a condition falls under a prescribed condition, wherein said prescribed condition is a distance between said first object and a second object.

14. A computer-readable recording medium comprising:
  a program for controlling a computer, which reads the computer-readable recording medium, to cause the computer to perform an image displaying method comprising the steps of:
  a small screen forming step for forming in a monitor screen a small screen displaying a surrounding situation of said first object;
  a distinguishing step for distinguishing whether or not a condition falls under a prescribed condition to magnify or reduce a display of said small screen during a game progressing in a virtual space; and
  a display altering step for altering the display of said small screen to be magnified or reduced upon falling under said condition; wherein
  said prescribed condition is a distance between said first object and a second object exceeding a reference value.

15. A game device which displays on a monitor screen a picture of a game being proceeded in a virtual space by a first object controller by a player and a second object controlled by a computer or an opponent, comprising:

a support screen forming, circuit for forming in said monitor screen a small screen displaying information which supports the control of said first object;

a display mode alteration distinguishing circuit for distinguishing whether or not a condition falls under a prescribed condition to alter a display range of said small screen during the game progress in said virtual space; and a display range setting circuit for setting the display range of said small screen pursuant to a distinction result of said distinguishing circuit; wherein said prescribed condition is a distance between said first object and said second object exceeding a reference value.

* * * * *